United States Patent
Zhang

(10) Patent No.: US 10,323,560 B2
(45) Date of Patent: Jun. 18, 2019

(54) EXHAUST GAS MIXER

(71) Applicant: Ford Global Technologies, LLC, Dearborn, MI (US)

(72) Inventor: Xiaogang Zhang, Novi, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 781 days.

(21) Appl. No.: 14/823,700

(22) Filed: Aug. 11, 2015

(65) Prior Publication Data
US 2017/0044956 A1 Feb. 16, 2017

(51) Int. Cl.
*F01N 3/28* (2006.01)
*F01N 3/20* (2006.01)
*B01F 5/06* (2006.01)
*B01F 3/02* (2006.01)

(52) U.S. Cl.
CPC .............. *F01N 3/2892* (2013.01); *B01F 3/02* (2013.01); *B01F 5/0644* (2013.01); *F01N 3/2066* (2013.01); *F01N 2240/20* (2013.01); *Y02T 10/24* (2013.01)

(58) Field of Classification Search
CPC ............. F01N 13/2892; F01N 13/2066; F01N 2240/20; F01N 3/2892; F01N 3/2066; B01F 5/0644; B01F 3/02
USPC ...................................................... 366/162.4
See application file for complete search history.

(56) References Cited

U.S. PATENT DOCUMENTS

| | | | |
|---|---|---|---|
| 3,394,924 A * | 7/1968 | Harder | B01F 5/0644 366/338 |
| 8,341,936 B2 | 1/2013 | Zhang | |
| 8,756,913 B2 | 6/2014 | Liu et al. | |
| 2015/0047330 A1 | 2/2015 | Zhang | |

FOREIGN PATENT DOCUMENTS

| WO | WO-2010062017 A1 * | 6/2010 | ......... B01F 3/04787 |
|---|---|---|---|
| WO | 2013188880 A1 | 12/2013 | |
| WO | 2015020820 A1 | 12/2015 | |

OTHER PUBLICATIONS

Machine translation of WO-2010062017, accessed via worldwide.espacenet.com on Jan. 22, 2018.*
Zhang, Xiaogang, "Exhaust Flow Device," U.S. Appl. No. 14/706,650, filed May 7, 2015, 47 pages.
Zhang, Xiaogang, "Exhaust Gas Mixer," U.S. Appl. No. 14/943,620, filed Nov. 17, 2015, 45 pages.
Zhang, Xiaogang, "Static Flow Mixer With Multiple Open Curved Channels," U.S. Appl. No. 14/934,753, filed Nov. 6, 2015, 49 pages.

* cited by examiner

*Primary Examiner* — Marc C Howell
(74) *Attorney, Agent, or Firm* — Julia Voutyras; McCoy Russell LLP

(57) ABSTRACT

Systems are provided for a mixer. In one example, the mixer may include intersecting tubes with a plurality of inlets and/or outlets located along an exhaust conduit.

19 Claims, 10 Drawing Sheets

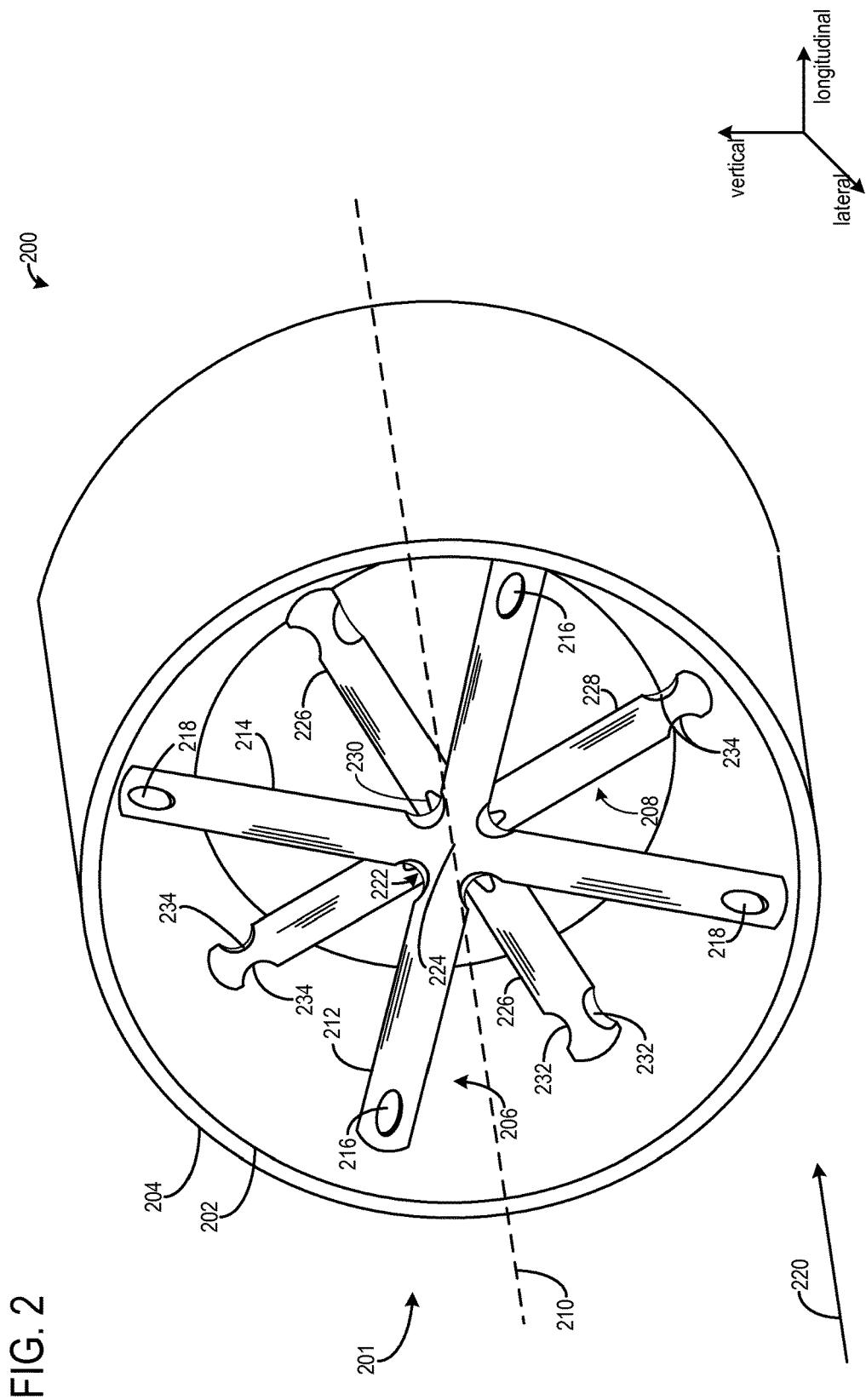

EXHAUST GAS MIXER

FIELD

The present description relates generally to systems for a mixing device.

BACKGROUND/SUMMARY

One technology for after-treatment of engine exhaust utilizes selective catalytic reduction (SCR) to enable certain chemical reactions to occur between NOx in the exhaust and ammonia (NH). $NH_3$ is introduced into an engine exhaust system upstream of an SCR catalyst by injecting urea into an exhaust pathway. The urea entropically decomposes to $NH_3$ under high temperature conditions. The SCR facilitates the reaction between $NH_3$ and NOx to convert NOx into nitrogen ($N_2$) and water ($H_2O$). However, as recognized by the inventor herein, issues may arise upon injecting urea into the exhaust pathway. In one example, urea may be poorly mixed into the exhaust flow (e.g., a first portion of exhaust flow has a higher concentration of urea than a second portion of exhaust flow) which may lead to poor coating of the SCR and poor reactivity between emissions (e.g., $NO_x$) and the SCR. Additionally, overly mixing and agitating the urea in the exhaust can likewise cause issues, such as increased deposits.

Attempts to address poor mixing include introducing a mixing device downstream of a urea injector and upstream of the SCR such that the exhaust flow may be homogenous. One example approach is shown by Liu et al. in U.S. Pat. No. 8,756,913. Therein, an exhaust gas sensor module is introduced to an exhaust pathway to help increase an exhaust gas homogeneity. The exhaust gas sensor module comprises a plus-shaped (e.g., cross-shaped) tube with a plurality of perforations along a face of the module facing a direction opposite exhaust flow. The exhaust gas enters the module and flows to a gas sensor and then exits the module via a single conical opening. There may be a second module, identical to the first module described above, located downstream of the first module with an exhaust component located between the first module and the second module.

However, the inventors have also recognized potential issues with such systems. As one example, by introducing two identical modules in an exhaust stream, the mixing in both the modules is also identical. In this way, an alteration in exhaust gas direction is reduced and thus, the randomness of the mixing may be reduced. Furthermore, a sensor is located inside each of the modules. Thus, the sensor is limited to measure only portions of the exhaust gas the module is capable of intercepting in the exhaust conduit.

In one example, the issues described above may be addressed by a mixer comprising a pair of cylindrical tubes perpendicularly intersecting along a central axis of an exhaust conduit, where each of the cylindrical tubes comprise two oblong inlets proximal to an exhaust conduit wall and two angled circular outlets proximal to the central axis facing toward, away from, and perpendicular to a direction of exhaust flow. In this way, exhaust gas flowing out of the mixer flows to regions of the exhaust conduit unperturbed by the mixer and increases an overall homogeneity of exhaust gas in the exhaust conduit. Thus, mixing is increased and a composition of exhaust gas throughout the entire exhaust conduit is substantially equal.

As one example, the mixer may intercept exhaust gas along an outer periphery of the exhaust conduit and allow the exhaust gas to collide and mix at a region of confluence located along a central axis of the mixer. The mixed exhaust gas flows into the exhaust conduit to be further mixed with unmixed exhaust gas of the exhaust conduit by flowing parallel to or perpendicular to an unmixed exhaust gas flow.

It should be understood that the summary above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

FIG. 2 illustrates a mixer.

FIGS. 3A and 3B are illustrated with identical orientation such that the figures show the relative positioning of the cylindrical tubes with respect to the vertical axis.

FIGS. 2 and 5 are shown approximately to scale, although other relative dimensions may be used.

DETAILED DESCRIPTION

Figure 1:
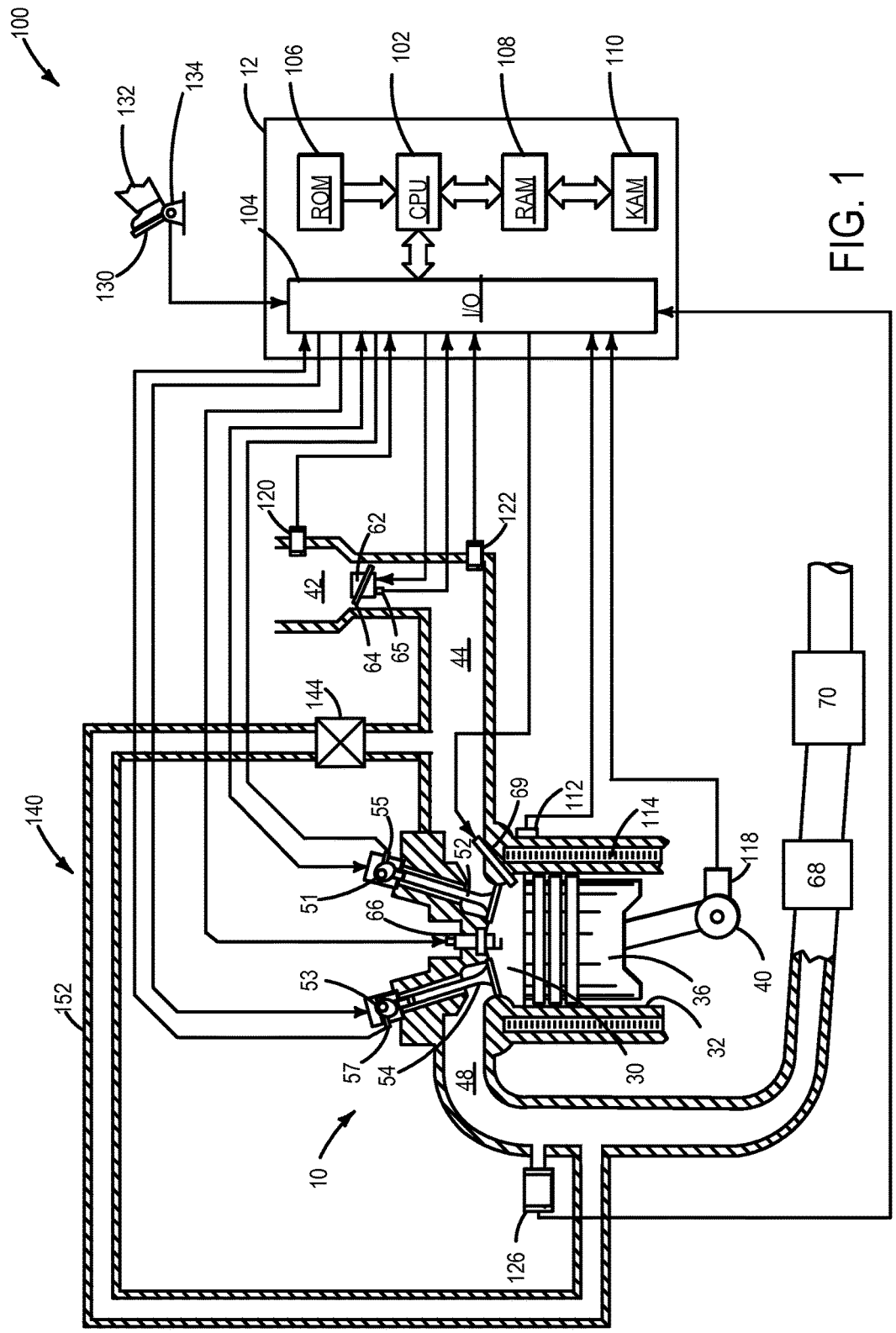
FIG. 1 illustrates an example cylinder of an engine.
Figure 3A:
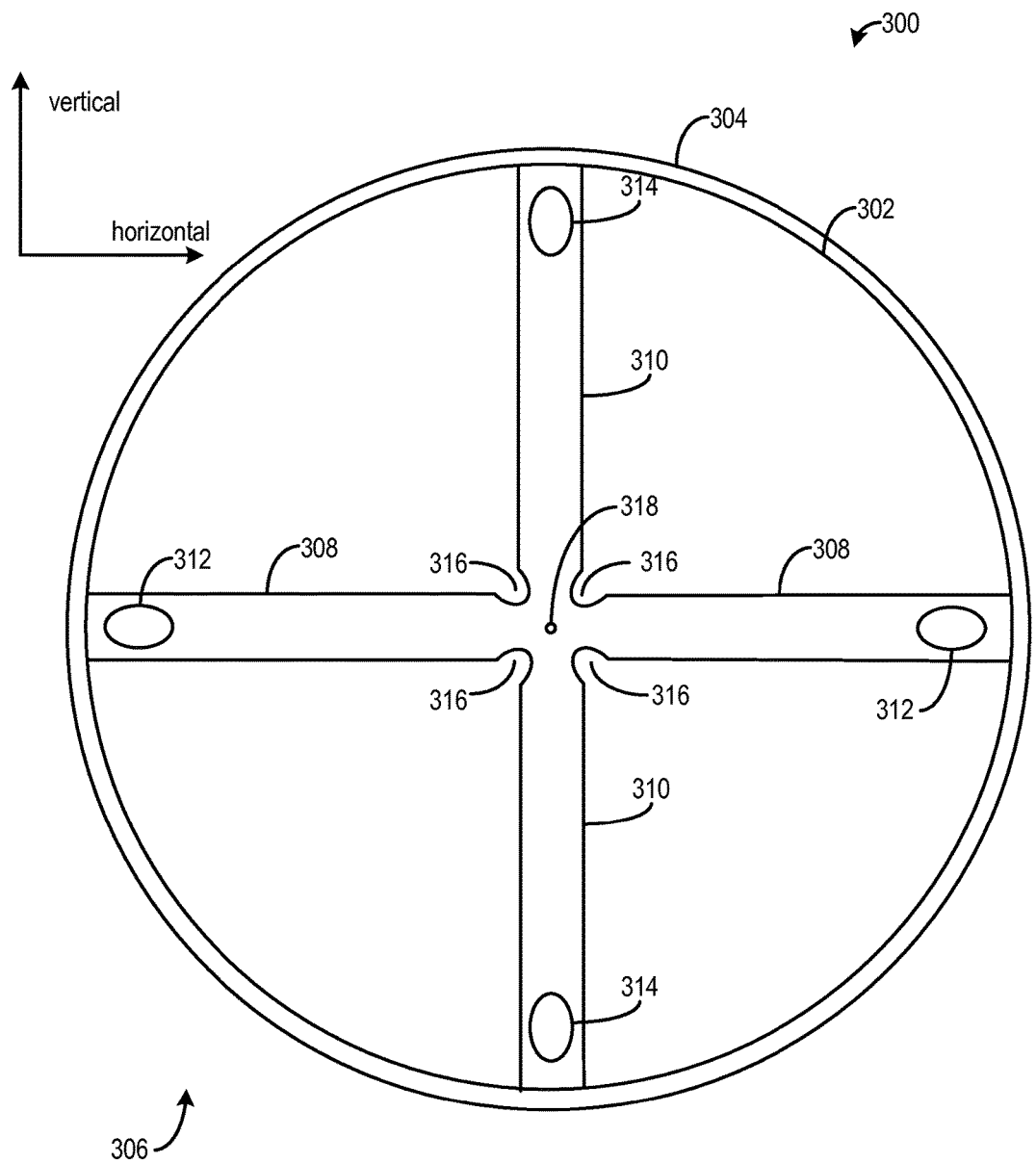
FIGS. 3A and 3B illustrate face-on views of an upstream section of the mixer and a downstream section of the mixer, respectively.
Figure 3B:
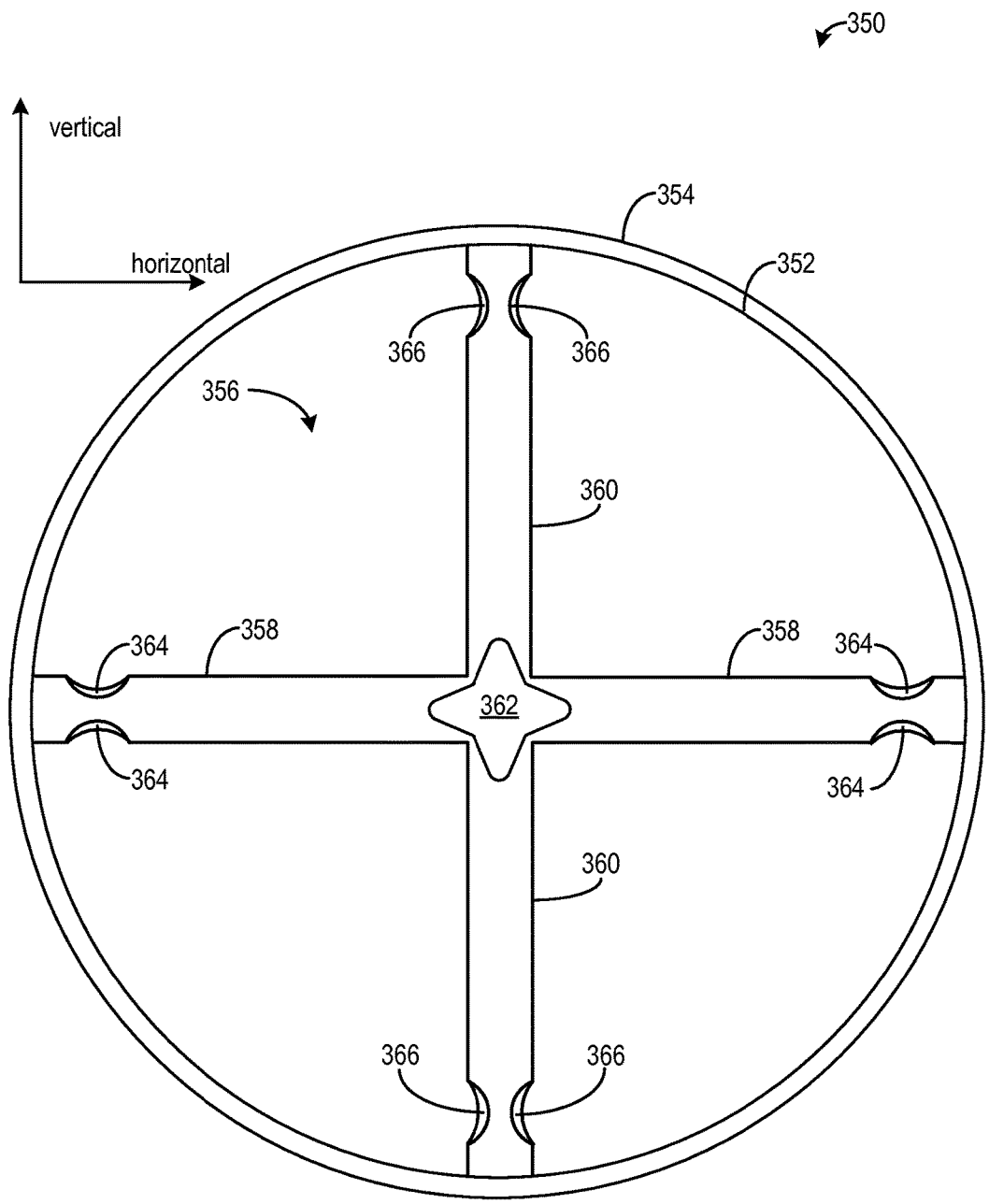
Figure 4:
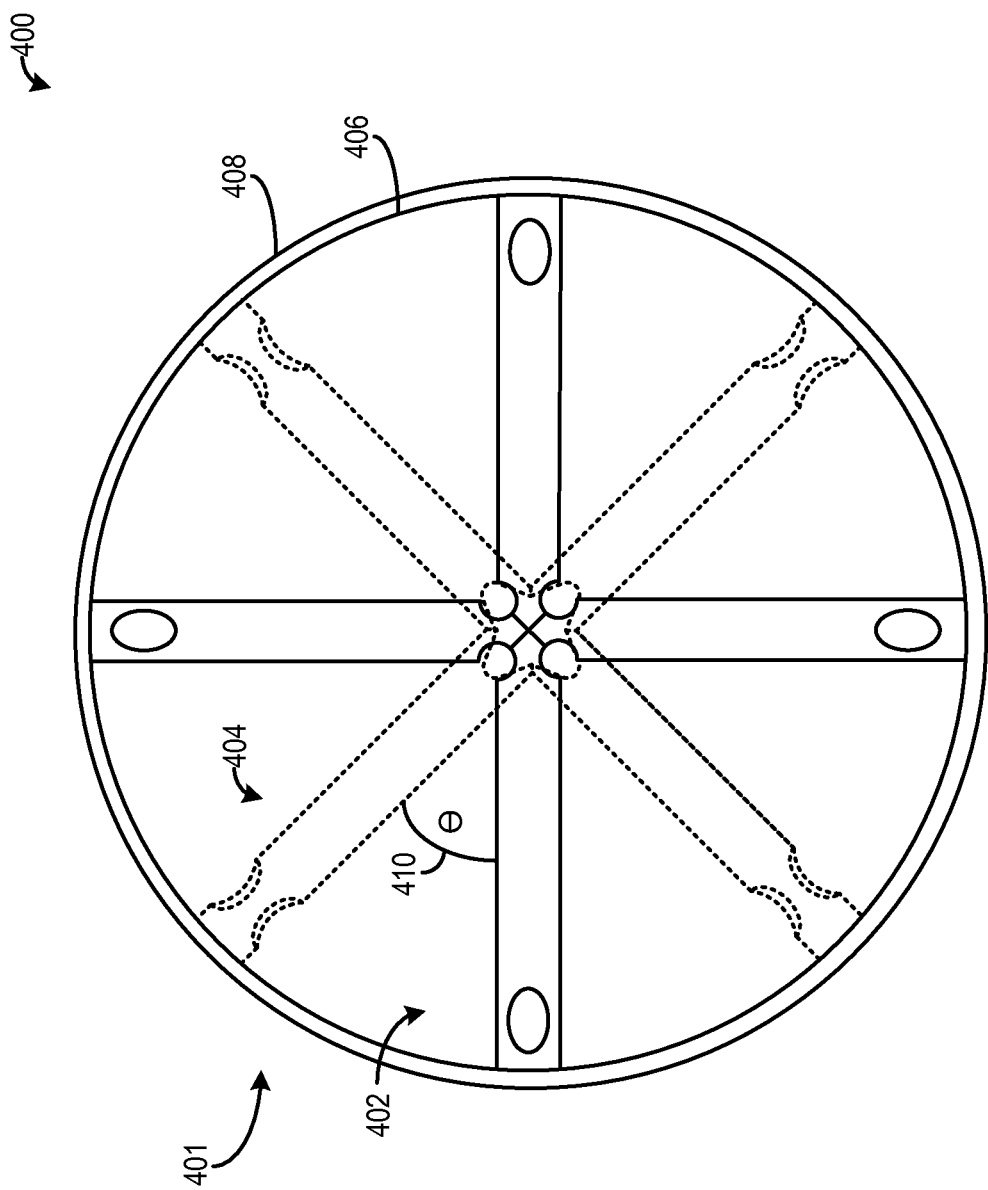
FIG. 4 illustrates a face-on view of the mixer.
Figure 6:
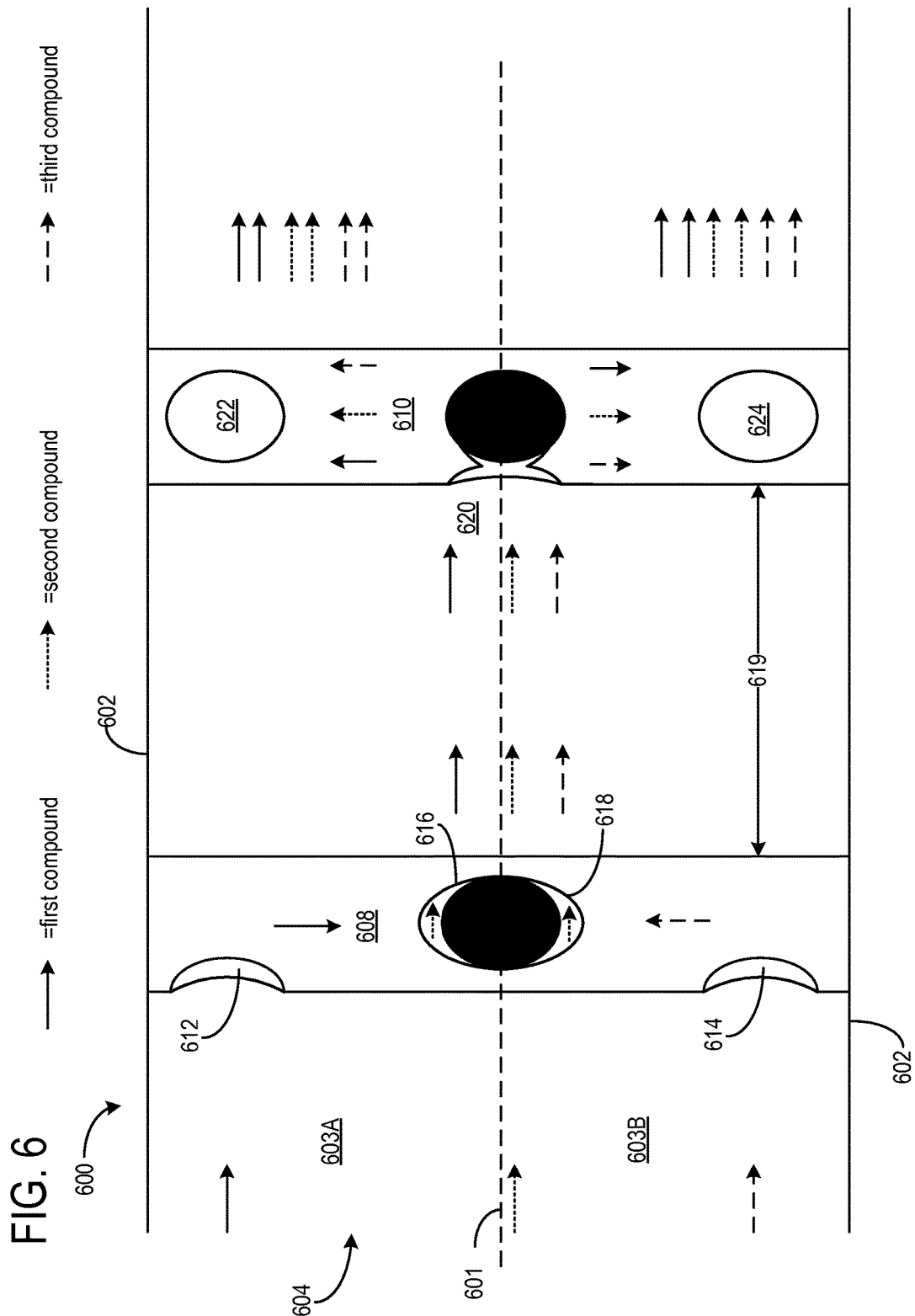
FIG. 6 illustrates an example flow flowing through a side-on view of the exhaust mixer in the exhaust conduit.
Figure 7:
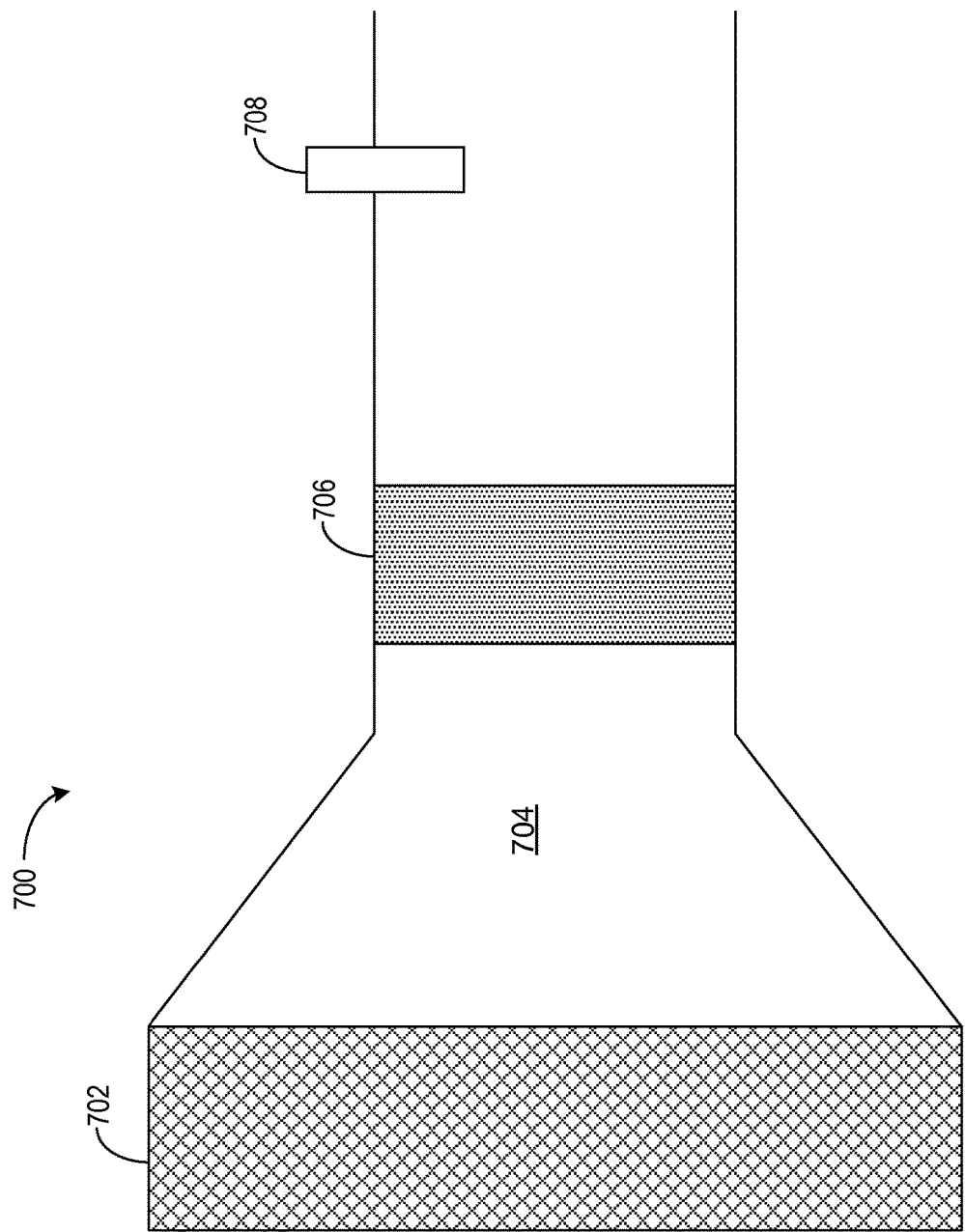
FIG. 7 illustrates an embodiment including the mixer downstream of a particulate filter.
Figure 8:
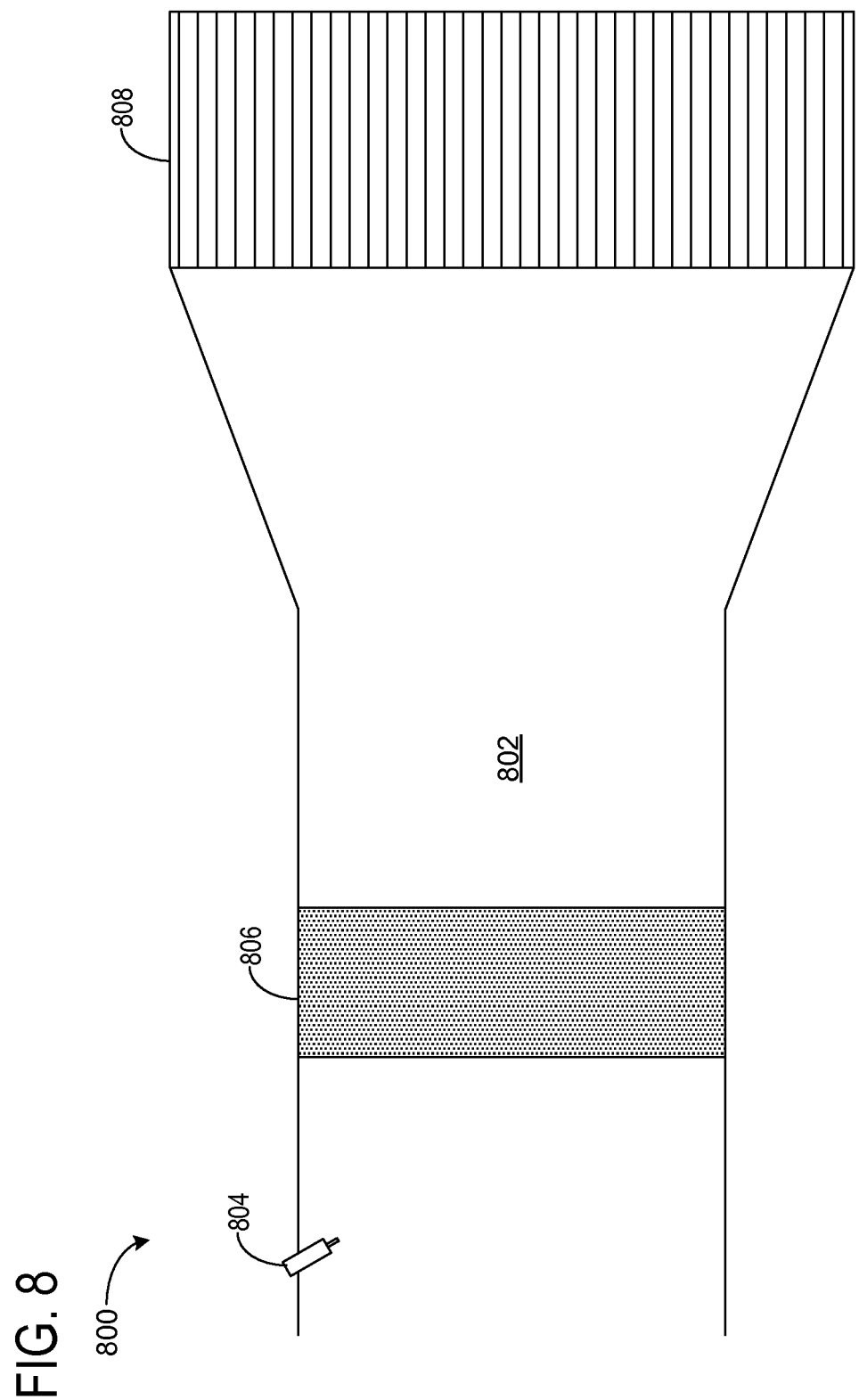
FIG. 8 illustrates an embodiment with the mixer downstream of a urea injector.
Figure 9:
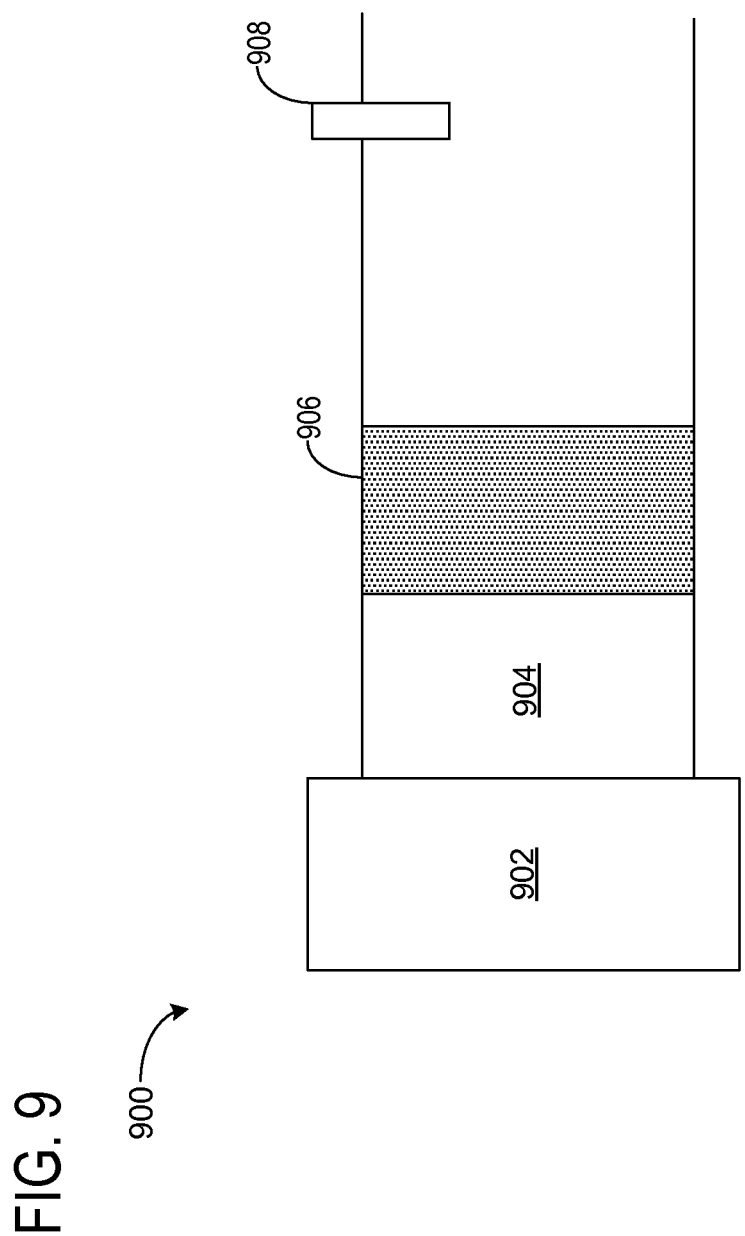
FIG. 9 illustrates an embodiment depicting the mixer upstream of a gas sensor.

The following description relates to systems and methods for a mixer located in an exhaust conduit of a vehicle. The vehicle comprises an engine capable of impelling a vehicle via combustion, as shown in FIG. 1. A product of combustion is exhaust gas, which comprises a variety of constituents. Also shown in FIG. 1, various sensors, actuators, and treatment devices are used to measure or interact with the exhaust gas. In order to obtain accurate measurements of a composition of the exhaust gas, it is desired to increase a homogeneity of the exhaust gas. The mixer depicted in FIG. 2 is capable of perturbing an exhaust flow such that a homogeneity of the exhaust gas is increased. Face-on views of a first section and a second section of the exhaust mixer are shown in FIGS. 3A and 3B. A face-on view of the exhaust mixer depicting an angular offset between the first and second sections is shown in FIG. 4. The mixer in an exhaust conduit is shown with respect to FIG. 5. One example of an exhaust gas flow through the mixer is shown with respect to FIG. 6. However, other example flows may exist. The mixer may be located downstream of a particulate filter, downstream of a urea injector and upstream of a selective catalytic reductant (SCR), and upstream of an exhaust gas sensor, as shown in FIGS. 7, 8, and 9, respectively.

Figure 5:
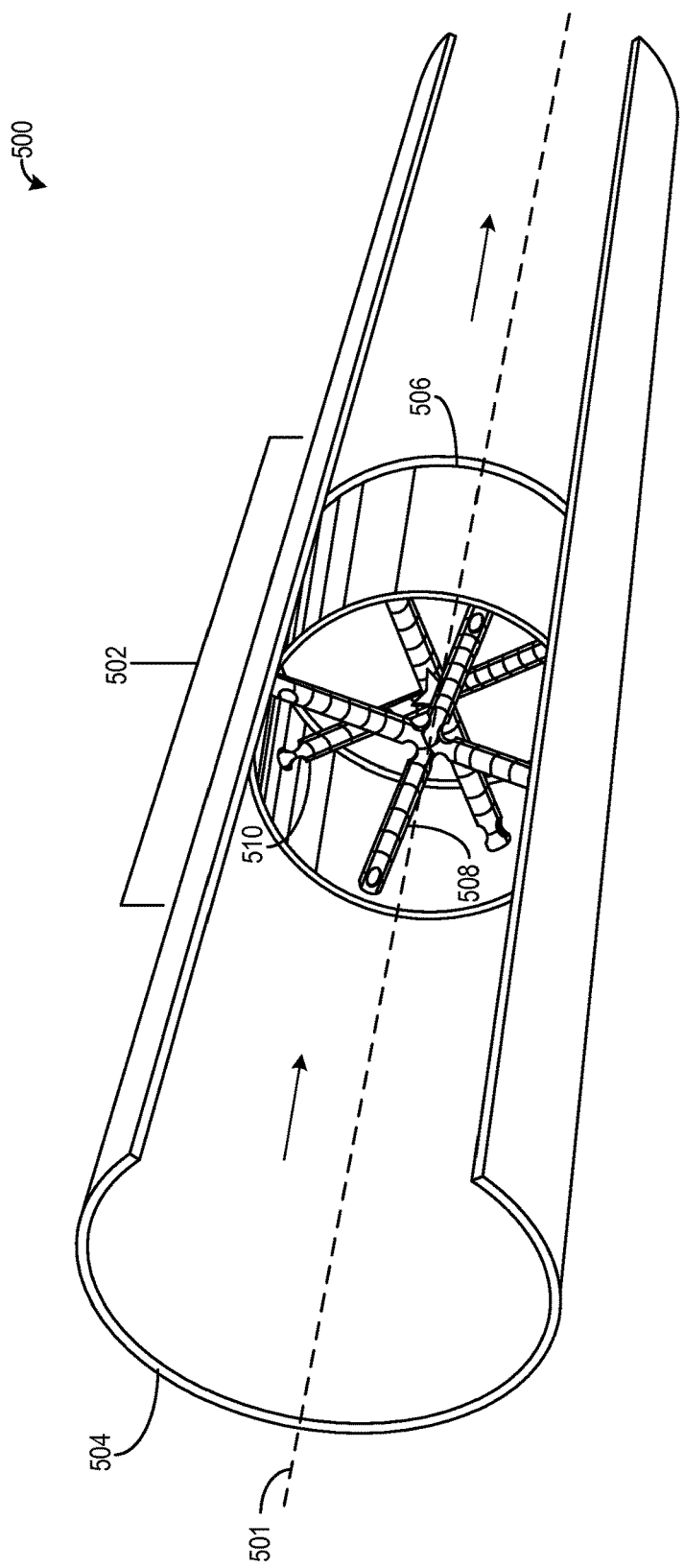
FIG. 5 illustrates an isometric view of the mixer in an exhaust conduit.

It will be appreciated that FIGS. 2 and 5 are drawn approximately to scale, although other relative dimensions may be used, if desired. FIGS. 2 and 5 show example configurations with relative positioning of the various components. If shown directly contacting each other, or directly coupled, then such elements may be referred to as directly contacting or directly coupled, respectively, at least in one example. Similarly, elements shown contiguous or adjacent to one another may be contiguous or adjacent to each other, respectively, at least in one example. As an example, components laying in face-sharing contact with each other may be referred to as in face-sharing contact. As another example, elements positioned apart from each other with only a space there-between and no other components may be referred to as such, in at least one example.

Continuing to FIG. 1, a schematic diagram showing one cylinder of a multi-cylinder engine 10 in an engine system 100, which may be included in a propulsion system of an automobile, is shown. The engine 10 may be controlled at least partially by a control system including a controller 12 and by input from a vehicle operator 132 via an input device 130. In this example, the input device 130 includes an accelerator pedal and a pedal position sensor 134 for generating a proportional pedal position signal. A combustion chamber 30 of the engine 10 may include a cylinder formed by cylinder walls 32 with a piston 36 positioned therein. The piston 36 may be coupled to a crankshaft 40 so that reciprocating motion of the piston is translated into rotational motion of the crankshaft. The crankshaft 40 may be coupled to at least one drive wheel of a vehicle via an intermediate transmission system. Further, a starter motor may be coupled to the crankshaft 40 via a flywheel to enable a starting operation of the engine 10.

The combustion chamber 30 may receive intake air from an intake manifold 44 via an intake passage 42 and may exhaust combustion gases via an exhaust passage 48. The intake manifold 44 and the exhaust passage 48 can selectively communicate with the combustion chamber 30 via respective intake valve 52 and exhaust valve 54. In some examples, the combustion chamber 30 may include two or more intake valves and/or two or more exhaust valves.

In this example, the intake valve 52 and exhaust valve 54 may be controlled by cam actuation via respective cam actuation systems 51 and 53. The cam actuation systems 51 and 53 may each include one or more cams and may utilize one or more of cam profile switching (CPS), variable cam timing (VCT), variable valve timing (VVT), and/or variable valve lift (VVL) systems that may be operated by the controller 12 to vary valve operation. The position of the intake valve 52 and exhaust valve 54 may be determined by position sensors 55 and 57, respectively. In alternative examples, the intake valve 52 and/or exhaust valve 54 may be controlled by electric valve actuation. For example, the cylinder 30 may alternatively include an intake valve controlled via electric valve actuation and an exhaust valve controlled via cam actuation including CPS and/or VCT systems.

A fuel injector 69 is shown coupled directly to combustion chamber 30 for injecting fuel directly therein in proportion to the pulse width of a signal received from the controller 12. In this manner, the fuel injector 69 provides what is known as direct injection of fuel into the combustion chamber 30. The fuel injector may be mounted in the side of the combustion chamber or in the top of the combustion chamber, for example. Fuel may be delivered to the fuel injector 69 by a fuel system (not shown) including a fuel tank, a fuel pump, and a fuel rail. In some examples, the combustion chamber 30 may alternatively or additionally include a fuel injector arranged in the intake manifold 44 in a configuration that provides what is known as port injection of fuel into the intake port upstream of the combustion chamber 30.

Spark is provided to combustion chamber 30 via spark plug 66. The ignition system may further comprise an ignition coil (not shown) for increasing voltage supplied to spark plug 66. In other examples, such as a diesel, spark plug 66 may be omitted.

The intake passage 42 may include a throttle 62 having a throttle plate 64. In this particular example, the position of throttle plate 64 may be varied by the controller 12 via a signal provided to an electric motor or actuator included with the throttle 62, a configuration that is commonly referred to as electronic throttle control (ETC). In this manner, the throttle 62 may be operated to vary the intake air provided to the combustion chamber 30 among other engine cylinders. The position of the throttle plate 64 may be provided to the controller 12 by a throttle position signal. The intake passage 42 may include a mass air flow sensor 120 and a manifold air pressure sensor 122 for sensing an amount of air entering engine 10.

An exhaust gas sensor 126 is shown coupled to the exhaust passage 48 upstream of an emission control device 70 according to a direction of exhaust flow. The sensor 126 may be any suitable sensor for providing an indication of exhaust gas air-fuel ratio such as a linear oxygen sensor or UEGO (universal or wide-range exhaust gas oxygen), a two-state oxygen sensor or EGO, a HEGO (heated EGO), a $NO_x$, HC, or CO sensor. In one example, upstream exhaust gas sensor 126 is a UEGO configured to provide output, such as a voltage signal, that is proportional to the amount of oxygen present in the exhaust. Controller 12 converts oxygen sensor output into exhaust gas air-fuel ratio via an oxygen sensor transfer function.

The emission control device 70 is shown arranged along the exhaust passage 48 downstream of both the exhaust gas sensor 126 and a mixer 68. The device 70 may be a three way catalyst (TWC), $NO_x$ trap, selective catalytic reductant (SCR), various other emission control devices, or combinations thereof. In some examples, during operation of the engine 10, the emission control device 70 may be periodically reset by operating at least one cylinder of the engine within a particular air-fuel ratio.

The mixer 68 is shown upstream of the emission control device 70 and downstream of the exhaust gas sensor 126. In some embodiments, additionally or alternatively, a second exhaust gas sensor may be located between the mixer 68 and the emission control device 70 or downstream of the emission control device. The mixer 68 comprises multiple sections, for example two or more sections and in one example exactly two sections, cascaded along an exhaust flow direction in the exhaust passage 48. The mixer 68 may perturb an exhaust flow such that a homogeneity of an exhaust gas mixture is increased as the exhaust gas flows through the mixer 68. The mixer 68 will be described in further detail below, such as with regard to FIGS. 2-6.

An exhaust gas recirculation (EGR) system 140 may route a desired portion of exhaust gas from the exhaust passage 48 to the intake manifold 44 via an EGR passage 152. The amount of EGR provided to the intake manifold 44 may be varied by the controller 12 via an EGR valve 144. Under some conditions, the EGR system 140 may be used to regulate the temperature of the air-fuel mixture within the combustion chamber, thus providing a method of controlling the timing of ignition during some combustion modes.

The controller 12 is shown in FIG. 1 as a microcomputer, including a microprocessor unit 102, input/output ports 104, an electronic storage medium for executable programs and calibration values shown as read only memory chip 106 (e.g., non-transitory memory) in this particular example, random access memory 108, keep alive memory 110, and a data bus. The controller 12 may receive various signals from sensors coupled to the engine 10, in addition to those signals previously discussed, including measurement of inducted mass air flow (MAF) from the mass air flow sensor 120; engine coolant temperature (ECT) from a temperature sensor 112 coupled to a cooling sleeve 114; an engine position signal from a Hall effect sensor 118 (or other type) sensing a position of crankshaft 40; throttle position from a throttle position sensor 65; and manifold absolute pressure (MAP) signal from the sensor 122. An engine speed signal may be generated by the controller 12 from crankshaft position sensor 118. Manifold pressure signal also provides an indication of vacuum, or pressure, in the intake manifold 44. Note that various combinations of the above sensors may be used, such as a MAF sensor without a MAP sensor, or vice versa. During engine operation, engine torque may be inferred from the output of MAP sensor 122 and engine speed. Further, this sensor, along with the detected engine speed, may be a basis for estimating charge (including air) inducted into the cylinder. In one example, the crankshaft position sensor 118, which is also used as an engine speed sensor, may produce a predetermined number of equally spaced pulses every revolution of the crankshaft.

The storage medium read-only memory 106 can be programmed with computer readable data representing non-transitory instructions executable by the processor 102 for performing the methods described below as well as other variants that are anticipated but not specifically listed.

The controller 12 receives signals from the various sensors of FIG. 1 and employs the various actuators of FIG. 1 to adjust engine operation based on the received signals and instructions stored on a memory of the controller.

FIG. 1 depicts an example system comprising a mixer. The mixer may comprise two or more stages (e.g., sections). In one example including only two stages, a first stage is positioned upstream of the second stage with regard to a direction of exhaust flow exiting the engine and flowing toward a tailpipe. In another example, the mixer may comprise only the first stage or only the second stage, where the second stage is distinct from the first stage. The second, distinct stage is located downstream and away from the first stage. Each of the first stage and second stage comprise two cylindrical tubes perpendicularly intersecting at a central axis of an exhaust conduit. The tubes fully intersect with each other at a midpoint along the length of the tubes defining a common interior region connected with inlets and outlets of the corresponding stage, respectively. The second stage is rotated about the central axis of the exhaust conduit relative to the first stage, in one example by 45 degrees. The first stage comprises a total of four oblong inlet openings where each tube comprises two oblong inlet openings. The oblong inlets are located distal to the central axis near ends of the tubes. The first stage further comprises angled, circular outlets proximal to the central axis of the exhaust conduit. The circular outlets are angled such that exhaust flowing out the outlets flows in a direction perpendicular to and parallel with a direction of exhaust flow in the exhaust conduit (e.g., an exhaust pipe). In one example, the circular outlets face sideways and face no more upstream than downstream with regard to a direction of exhaust flow exiting the engine and flowing toward a tailpipe. The second stage comprises an opening roughly shaped as a four-point star-shaped centered along the central axis where each point of the opening extends toward one end of the cylindrical tubes of the second stage. The second stage further comprises two oblong openings near an end of each tube facing a direction perpendicular to the direction of exhaust flow in the exhaust conduit. The inlets of the first and second stages are symmetrically positioned with each other, and wherein the outlets of the first and second stages are symmetrically positioned with each other. In this way, the exhaust flow intercepted by the mixer components is opposite due to the location of the inlets of the first stage and the second stage. By doing this, an exhaust gas flowing through the mixer has an increased likelihood of mixing compared to exhaust gas flowing through an exhaust conduit without the mixer or with only a single type of mixing component. Additional details of the mixer will be described in greater detail below. Detailed depictions of additional example details of the above described mixer are illustrated in FIGS. 2, 3A, 3B, 4, and 5.

Turning now to FIG. 2, a system 200 comprises a mixer 201 physically coupled to a mixer pipe 202 in an exhaust conduit 204. The mixer 201 comprises two stages displaced along an exhaust flow direction in the exhaust conduit 204. The mixer 201 may be used as mixer 68 and may be used in the embodiment depicted with respect to FIG. 1. In the current depiction, only a border of the exhaust conduit 204 is depicted in order to reveal the mixer pipe 202.

The mixer 201 may be a single machined piece. The mixer 201 may comprise one or more of a ceramic material, a metal alloy, a silicon derivative, or other suitable materials capable of withstanding high temperatures while also mitigating friction experienced by an exhaust flow such that an exhaust pressure is maintained. Additionally or alternatively, the mixer 201 may comprise of one or more coatings and materials such that exhaust may contact surfaces of the mixer 201 without depositing soot or other exhaust gas components on the mixer 201.

The mixer 201 comprises a first upstream portion 206 (e.g., first stage) and a second downstream portion 208 (e.g., second stage). In one example, the first stage 206 is located nearer to an engine exhaust (e.g., engine 10 of FIG. 1) than the second stage 208. The second stage 208 is displaced downstream from the first stage 206 by 30-40 millimeters in one example. It will be appreciated by someone skilled in the art that a distance between the first stage 206 and the second stage 208 may be less than 30 millimeters or greater than 40 millimeters. In some embodiments, the second stage 208 may be omitted. The mixer 201, the first stage 206, and the second stage 208 may be rotationally symmetric in one example.

In some embodiments, additionally or alternatively, the exhaust conduit 204 may comprise more than one of the mixer 201. For example, the exhaust conduit 204 may comprise exactly two of the mixers 201. In the example of two mixers being located in the exhaust conduit 204, there may be no components located between a first mixer and a second mixer. In other embodiments, the mixers may be separated by one or more exhaust components. It will be appreciated by someone skilled in the art that a suitable number of mixers may exist in the exhaust conduit 204.

The second stage 208 may be angularly offset from the first stage 206 by 45° relative to a central axis 210, in one example. By being offset in this way with the two tubes each being perpendicular to one another, an exhaust flow may be manipulated such that the flow is directed to the second stage 208 to be further mixed after being mixed in the first stage 206. In this way, an exhaust gas composition increases in homogeneity, resulting in greater data analysis (e.g., gas composition, soot concentration, etc.) and reactivity (e.g., oxidation, reduction, etc.).

The first stage 206 and the second stage 208 are both physically coupled directly to the mixer pipe 202. The first stage 206 and the second stage 208 are non-rotatably fixed and immovable (e.g., static). The first stage 206 and the second stage 208 are substantially equal in outer dimensions (e.g., height, length, and width). In this way, the first stage 206 and the second stage 208 may hold substantially equal volumes of exhaust gas.

The first stage 206 comprises a pair of cylindrical tubes 212 and 214 perpendicularly intersecting at the central axis 210. The cylindrical tubes 212 and 214 are substantially equal in length, diameter, and height. In one example, central axes of each of tubes 212 and 214 intersect with the central axis 210 of the exhaust tube. In one example, the tubes 212 and 214 fully intersect with each other at a midpoint along the length of the tubes defining a common interior region connected with inlets and outlets of the first stage 206. As depicted, the first stage 206 comprises a plus-shaped (e.g., cross-shaped) cross-section along a vertical axis of the mixer 201. Ends of the tubes 212 and 214 are contiguous with and are fixed to the mixer pipe 202. Portions of the ends of tubes 212 and 214 are curved such that their curvature mimics a curvature of the mixer pipe 202. In this way, the tubes 212 and 214 are hermetically coupled to the mixer pipe 202. The tubes 212 and 214 may be fused to or welded to the mixer pipe 202.

The tube 212 comprises two oblong openings 216 located distal to the central axis 210 (e.g., proximal to the mixer pipe 202). The openings 216 are located at opposite ends of the tube 212 such that each end of the tube 212 comprises a single oblong opening 216. Additionally, the tube 214 comprises two oblong opening 218, substantially identical to the two oblong openings 216, located distal to the central axis 210. The oblong openings 218 are located at opposite ends of the tube 214 such that each end of the tube 214 comprises a single oblong opening 218. A distance between the two oblong openings 216 is substantially equal to a distance between the two oblong openings 218. The oblong openings 216 and 218 are fluidly coupled to an interior of the first stage 206.

As shown, the oblong openings 216 and 218 face a direction opposite to a direction of exhaust flow. Arrow 220 indicates a direction of exhaust flow. In this way, exhaust gas flowing near an outer periphery of the first stage 206 may flow into the oblong openings 216 and 218 and flow through passages located in the first stage 206. Therefore, the exhaust gas flowing in the exhaust conduit 204 may enter in and flow through an entire volume of the first stage 206. In this way, different compounds flowing through the oblong openings 216 and 218 may collide and mix within the first stage 206 before exiting the first stage 206 via outlets 222.

Outlets 222 are located proximal to a region of intersection between the tubes 212 and 214. The outlets 222 are circular and angled. For example, the outlets 222 are oriented such that a front portion of the outlets 222 faces a direction opposite exhaust flow and a back portion of the outlets 222 faces a direction parallel exhaust flow, while a middle portion faces a direction perpendicular to exhaust flow. A half of each of the outlets 222 is located on tube 212 while the other half is located on tube 214. In this way, exhaust gas flowing through the exhaust conduit 204, may flow through the outlets 222 without entering the first stage 206.

A region of confluence 224 is located along the central axis 210 at the intersection between the tubes 212 and 214. In this way, exhaust gas intercepted by each of the oblong openings 216 and 218 may flow and collide (e.g., mix) at the region of confluence 224 before flowing through the outlets 222. Exhaust gas flowing from the first stage 206 and through the outlets 222 mixes with exhaust gas flowing proximal to, and outside of the outlets 222 in the exhaust conduit 204. Thus, a homogeneity of the exhaust gas is increased within the first stage 206. Exhaust flowing out the outlets 222 is redirected by exhaust gas flowing in the exhaust conduit 204 outside the first stage 206 and flows toward the second stage 208.

The oblong openings 216 and 218 are configured to allow a volume of gas into the first stage 206 substantially equal to a volume of gas exiting the first stage 206 via the outlets 222. In this way, an exhaust backpressure may not occur as a result of the first stage 206. Furthermore, by having a rate of gas flow into the first stage 206 be substantially equal to a rate of gas flow out of the first stage 206, a mixing of gas within the first stage 206 is increased compared to an example comprising a rate of gas flow in being less than a rate of gas flow out of the first stage 206. In one embodiment, a total surface area of the oblong openings 216 and 218 may be substantially equal to a total surface area of the outlets 222. In some embodiments, a total surface area of the oblong openings 216 and 218 may be unequal to a total surface area of the outlets 222.

The second stage 208 comprises a pair of cylindrical tubes 226 and 228 perpendicularly intersecting at the central axis 210. A region of intersection of the cylindrical tubes 226 and 228 is directly downstream of the intersection between the cylindrical tubes 212 and 214. The cylindrical tubes 226 and 228 are substantially equal in length, diameter, and height. As depicted, the second stage 208 comprises an "X-shape" (e.g., cross-shape rotated about the central axis) cross-section along the vertical axis of the mixer 201. In one example, the tubes 226 and 228 fully intersect with each other at a midpoint along a length of the tubes 226 and 228 defining a common interior region connected with inlets and outlets of the second stage 208. Outer peripheral portions (e.g., ends) of the tubes 226 and 228 are in face-sharing contact with the mixer pipe 202 and thus, are curved in a manner similar to the curvature of the mixer pipe 202. The tubes 226 and 228 may be fused to or welded to the mixer pipe 202. In this way, the tubes 226 and 228 are hermetically sealed with the mixer pipe 202.

An inlet 230 is located along the region of intersection of the tubes 226 and 228 of the second stage 208, directly downstream the region of confluence 224 and the outlets 222 of the first stage 206. The inlet 230 is a four-point star shape, where each point of the inlet 230 extends toward an outer periphery (e.g., end) of the second stage 208. It will be appreciated by someone skilled in the art that other suitable inlet shapes may be used (e.g., a square, a circle, a diamond, etc.). The inlet 230 fluidly couples an internal portion of the second stage 208 to the exhaust conduit 204. In this way, exhaust gas flowing through the second stage 208 flows into the internal portion of the second stage 208 and fills a volume of the second stage 208.

The second stage 208 further comprises outlets 232 and 234 located near outer peripheries of the cylindrical tubes 226 and 228, respectively. In one example, tube 226 comprises exactly four outlets 232, where two outlets 232 are located at a first end and two outlets 232 are located at a second end of the tube 226. Likewise, tube 228 comprises exactly four outlets 234, where two outlets 234 are located at a first end and two outlets 234 are located at a second end of the tube 228.

Outlets 232 and 234 are substantially identical. The outlets 232 and 234 are oblong, similar to openings 216 and 218 of the first stage 206. Outlets 232 face a direction substantially parallel to the tube 228 while outlets 234 face a direction substantially parallel to the tube 226. In this way, outlets 232 and outlets 234 face directions perpendicular to one another. Furthermore, outlets 232 and 234 are perpendicular to the direction of exhaust flow in the exhaust conduit 204. In this way, exhaust gas is further perturbed and mixing is improved.

The inlet 230 and outlets 232 and 234 may allow a substantially equal volume of gas to flow through their orifices. Thus, a volume of gas entering the second stage 208 may be substantially equal to a volume of gas exiting the second stage 208.

In one example, the inlets, outlets, openings, apertures, etc. shown are the only openings through the walls of the tubes of the mixer. In other words, there are no other inlets and no additional outlets in the first and second set of tubes other than those specified FIG. 2 depicts an upstream portion and a downstream portion of an exhaust gas mixer located in an exhaust conduit. FIGS. 3A and 3B depict face-on views of the upstream portion and the downstream portion, respectively.

Turning now to FIG. 3A, a face-on, two-dimensional view 300 of an upstream portion 306 (i.e., the first stage 206 of FIG. 2) is depicted. The upstream portion 306 is located in a mixer pipe 302. The mixer pipe 302 is physically coupled to an exhaust conduit 304. The mixer pipe 302 and exhaust conduit 304 may be used as mixer pipe 202 and exhaust conduit 204 in the embodiment of FIG. 2.

Vertical and horizontal axes are depicted. The vertical axis extends in upward and downward directions. The horizontal axis extends in leftward and rightward directions.

The first stage 306 comprises cylindrical tubes 308 and 310. Cylindrical tube 310 is parallel to a vertical axis in upward and downward directions. Cylindrical tube 308 is parallel to the horizontal axis in leftward and rightward directions. The cylindrical tube 308 perpendicularly intersects the cylindrical tube 310 at a region of confluence 318. The region of confluence 318 allows exhaust gas flowing from the cylindrical tube 308 and the cylindrical tube 310 to mix within the first stage 306. Thus, the region of confluence 318 is located in a portion of the first stage 306 where a flow direction of exhaust gas from each of the oblong openings 312 and 314 is opposed.

As depicted, the tube 308 comprises a pair of oblong openings 312. A first of the oblong openings 312 is located at a first end (e.g., a leftward end) of the tube 308, while a second of the oblong openings 312 is located at a second end (e.g., a rightward end) of the tube 308 opposite the first oblong opening 312. Thus, as exhaust flows through the exhaust conduit 304, the oblong openings 312 may receive exhaust gas of different compositions (e.g., different concentrations of various compounds). The exhaust received in the oblong openings 312 flows through an interior conduit of the tube 308.

Likewise, the tube 310 comprises a pair of oblong openings 314, substantially identical to the oblong openings 312. A first of the oblong openings 314 is located at a first end (e.g., upward end) of the tube 310, while a second of the oblong openings 314 is located at a second end (e.g., downward end) of the tube 310 opposite the first oblong opening 312. As exhaust flow through the exhaust conduit 304, the first and second oblong openings 314 may receive exhaust gas of different compositions. The exhaust gas received in the oblong openings 314 flows through an interior conduit of the tube 310.

The interior conduits of the tubes 308 and 310 are fluidly coupled at the region of confluence 318. The different exhaust gas compositions mix at the region of confluence 318 before flowing out the outlets 316. As described above, the outlets 316 face directions opposing to, perpendicular with, and parallel to a direction of exhaust gas flow. In this way, exhaust gas flowing through a center of the exhaust conduit 304 (e.g., an intersection of the horizontal and vertical axes) may aid with the exhaust mixture at the region of confluence 318 flowing through the outlets 316 to a remainder of the exhaust conduit 304 (e.g., toward a downstream portion of the mixer 302.

In one example, an exhaust gas composition may vary based on a zone. For example, an upward outer periphery along the vertical axis near the upper oblong opening 314 may comprise a different exhaust gas composition than the lower oblong opening 314 located near a downward outer periphery of the vertical axis. Likewise, a leftward outer periphery of the horizontal axis near the leftward oblong opening 312 may comprise a different exhaust gas composition than the rightward oblong opening 312 located near a rightward outer periphery of the horizontal axis. Furthermore, the exhaust gas compositions located along the horizontal axis may differ from those located along the vertical axis. Thus, each of the oblong openings 312 and 314 may receive a differently composed exhaust gas (e.g., the upstream portion receives exactly four different exhaust gas compositions, a different composition flows through each one of the oblong openings 312 and 314). The four compositions may mix and increase in homogeneity at the region of confluence 318. A fifth exhaust gas composition may flow along a center of the exhaust conduit 304 (e.g., intersection of the vertical and the horizontal axes) and mix with the exhaust gas flowing out of the outlets 316. The exhaust gas flowing out of the outlets 316 is redirected by the first exhaust gas composition and flows in a direction parallel to the direction of exhaust gas flow through the exhaust conduit 304.

Turning now to FIG. 3B, a face-on, two dimensional view 350 of a downstream portion 356 (e.g., the second stage 208 of FIG. 2) is depicted. The downstream portion 356 is located in a mixer pipe 352. The mixer pipe 352 is physically coupled to an exhaust conduit 354. The mixer pipe 352 and exhaust conduit 354 may be substantially identical to mixer pipe 202 and exhaust conduit 204 of FIG. 2. Additionally or alternatively, the mixer pipe 352 and exhaust conduit 354 may be extensions of the mixer pipe 302 and exhaust conduit 304 of FIG. 3A, respectively. Thus, the downstream portion 356 may be located downstream of the upstream portion 306. In such an example, the downstream portion 356 is rotated about a central axis by 45° relative to the upstream portion, as described above with respect to FIG. 2.

A vertical and horizontal axes are depicted. The vertical axis extends in upward and downward directions. The horizontal axis extends in leftward and rightward directions. The vertical and horizontal axes of FIG. 3B are rotated 45° relative to the vertical and horizontal axes of FIG. 3A in order to align with the downstream portion 356.

The downstream portion 356 comprises cylindrical tubes 358 and 360. Cylindrical tube 358 is parallel to the horizontal axis in leftward and rightward directions. Cylindrical tube 360 is parallel to the vertical axis in upward and downward directions. The cylindrical tube 358 perpendicularly intersects the cylindrical tube 360 at a center of the exhaust conduit (e.g., intersection between the horizontal and the vertical axes).

Located at the intersection of the cylindrical tubes 358 and 360 is a star-shaped inlet 362. The star-shaped inlet 362 is a four-point star shape with each point extending toward a different end of the second stage 356. For example, the four points extend in upward, downward, leftward, and rightward directions respectively.

As described above in FIG. 2, the upstream portion 306 (e.g., the first stage 206) and the downstream portion 356 (e.g., the second stage 208) are aligned along a central axis (e.g., central axis 210) of the exhaust conduit 354 (e.g., exhaust conduit 204). Therefore, the inlet 362 (e.g., inlet 230 of FIG. 2), which is aligned with the central axis, is located directly downstream of the outlets 316 (e.g., outlets 222 of FIG. 2) and receives at least a portion of an exhaust gas mixture flowing through the outlets 316. In this way, the downstream portion 356 is complementary to the upstream portion 306 and further mixes the exhaust gas.

Exhaust gas fills and flows through various internal passages of the downstream portion 356 as the exhaust gas enters the downstream portion 356 through the inlet 362. Internal passages follow a path substantially similar to a direction of the tubes 358 and 360. As one example, the exhaust gas mixture splits into four separate flows, each flowing toward a different end of the downstream portion 356. For example, the exhaust gas mixture flows toward an upward end and downward end of the tube 360 and to a leftward end and rightward end of the tube 358.

The exhaust in the horizontal tube 358 may flow out of outlets 364. As depicted, the leftward end and rightward end both comprise a pair of the outlets 364. In one example, the tube 358 comprises exactly four outlets 364. The outlets 364 face upward and downward directions. Exhaust flowing out of the outlets 364 is parallel to the vertical axis.

The exhaust in the vertical tube 360 may flow out of outlets 366. As depicted, the upward end and the downward end both comprise a pair of outlets 366. In one example, the tube 360 comprises exactly four outlets 366, where two of the outlets 366 are located on the upward end and the other two outlets 366 are located on the downward end. The outlets 366 face leftward and rightward directions. Exhaust flowing out of the outlets 366 is parallel to the horizontal axis.

In one example, the downstream portion 356 receives at least a portion of the exhaust gas mixture (e.g., the exhaust gas mixture mixing a first, second, third, fourth, and fifth exhaust gases with varying compositions) from the upstream portion 306 before further mixing the exhaust gas mixture. As described above, the exhaust gas flows in four different directions in the downstream portion 356. The exhaust gas may flow out of the downstream portion 356 into four zones of the exhaust conduit where exhaust gas has not yet interacted with the upstream or downstream portions.

For example, exhaust gas flowing either a left-upward direction, a right-upward direction, a left-downward direction, or a right-downward direction may not interact with the upstream portion 306 and remains unmixed. However, due to the rotation of the downstream portion 356 relative to the upstream portion 306, the exhaust gas mixture flowing out of the downstream portion 356 mixes with the unmixed exhaust gas. In this way, a homogeneity of exhaust gas flowing through the exhaust conduit is increased such that a composition of exhaust gas in any zone of the exhaust conduit is relatively similar to a composition of exhaust gas in a different zone.

FIGS. 3A and 3B depict face-on, two-dimensional views of a first stage and a second stage of a mixer, respectively. As described above, the first stage gathers exhaust gas from an outer periphery of an exhaust conduit and directs the exhaust gas to a region of confluence to allow the exhaust to mix before directing the exhaust gas toward a center portion of the exhaust conduit. The mixed exhaust in the center portion of the exhaust conduit flows to an inlet of the second stage located along a central portion of the exhaust conduit. The exhaust in the second stage is directed to an outer portion of the exhaust conduit to further flow through the exhaust conduit. FIG. 4 depicts a face-on view of the entire mixer. More specifically, FIG. 4 depicts a rotational offset between the first stage and the second stage.

Turning now to FIG. 4, a face-on, two-dimensional view 400 of the mixer 401 is depicted. The mixer 401 comprises a first stage 402 and a second stage 404. The first stage 402 is indicated by solid lines. The second stage 404 is indicated by dashed lines. The mixer 401 further comprises a mixer pipe 406 physically coupled to both the first stage 402 and the second stage 404. The mixer pipe 406 is hermetically sealed to an exhaust conduit 408. The mixer 401 may be used as the mixer 201 in the embodiment of FIG. 2 and/or used as mixer 68 in the embodiment of FIG. 1.

Arc 410 depicts an angle θ illustrating an angular offset between the first stage 402 and the second stage 404. As depicted, the angle θ is substantially equal to 45°. It will be appreciated by someone skilled in the art that the angle θ may be equal to values less than and greater than 45° (e.g., 30° and 60°). Furthermore, the angular offset allows the exhaust gas flowing out of the second stage 404 to combine and mix with exhaust gas that has not been affected by the first stage 402, as described above.

FIG. 4 depicts a face-on view of an exhaust mixer, including a first stage and a second stage, located in an exhaust conduit. FIG. 5 depicts an angled isometric view of the exhaust mixer located in an exhaust conduit. The mixer comprising two sections, an upstream section and a downstream section, where the downstream section is rotated about a central axis relative to the upstream section. In this way, the downstream section is complementary to the upstream section.

Turning now to FIG. 5, a system 500 depicts a mixer 502 located within an exhaust conduit 504. In one embodiment, the mixer 502 of system 500 may be used as mixer 201 in the embodiment of FIG. 2 and/or used as mixer 68 in the embodiment of FIG. 1. Arrows located along FIG. 5 indicate a direction of exhaust gas flow in the exhaust conduit 504.

The mixer 502 comprises a mixer pipe 506 physically coupled to the exhaust conduit 504. A portion of the exhaust conduit 504 has been omitted in order to depict the mixer 502. The mixer 502 comprises an upstream section 508 and a downstream section 510. The upstream section 508 and the downstream section 510 are substantially similar in dimensions. The upstream section 508 is located nearer to an engine (e.g., engine 10 of FIG. 1) than the downstream section 510. In this way, the upstream section 508 receives exhaust gas before the downstream section 510. The mixer 502 comprises free spaces located between the upstream section 508 and the downstream section 510. The mixer 502 further comprises free spaces between tubes of the upstream section 508 and the downstream section 510. The free spaces do not comprise other mixer elements and are occupied by empty space. The upstream section 508 and the downstream section 510 are aligned with and rotationally symmetric about a central axis 501.

As depicted, the upstream section 508 and the downstream section 510 are staggered. For example, exhaust flowing through outlets of the upstream section 508 has an increased likelihood of flowing into the downstream section 510. As a result, exhaust gas being mixed in the upstream section 508 will likely be further mixed in the downstream section 510.

FIG. 5 depicts an entirety of an exhaust mixer located within an exhaust conduit. FIG. 6 depicts an example flow of an exhaust gas interacting with a mixer. The mixer may manipulate the exhaust flow such that an overall exhaust gas profile comprises an average emission composition, as opposed to areas of high composition and low composition.

Turning now to FIG. 6, a system 600 depicts an exhaust conduit 602 guiding exhaust gas towards an exhaust mixer 604. System 600 is illustrative by nature and represents one example exhaust flow through the exhaust mixer 604. It will be appreciated by someone skilled in the art that other exhaust flows through the mixer may be realized based on engine load, exhaust temperature, etc. For example, as exhaust temperature increases, mixing through the mixer 502 may be increased due to an increase velocity of exhaust flow.

In one embodiment, the exhaust mixer 604 of system 600 may be used as mixer 201 in the embodiment of FIG. 2 and/or used as mixer 68 in the embodiment of FIG. 1. FIG. 6 is a side-on view of the mixer 604 and depicts an outline of a structure of the mixer 604 and its components. Dashed line 601 represents a center of the exhaust conduit 602, illustratively separating a top half 603A from a bottom half 603B of the exhaust conduit 602.

Exhaust conduit 602 (e.g., exhaust passage 48) comprises the exhaust mixer 604. The exhaust mixer 604 is physically coupled to the exhaust conduit 602 via a mixer pipe 606, as described above. The exhaust conduit 602 houses an entirety of the exhaust mixer 604 and the mixer pipe 606.

Exhaust gas flowing though the exhaust conduit 602 comprises various compounds. As depicted, a first compound is represented by a solid line arrow, a second compound is represented by a small dash arrow, and a third compound is represented by a large dash arrow. The various compounds in the exhaust gas may include one or more of oxygen, $CO_2$, soot, fuel, urea, nitrogen, etc. Thus, it is possible to for a greater number than three compounds to flow through the exhaust conduit 602. A direction of the compounds and the exhaust flow is indicated by the arrows.

As described above, each zone of the exhaust conduit 602 may comprise a different composition of compounds flowing in the exhaust gas. The mixer 604 aids to increase an overall homogeneity of the exhaust gas such that each zone of the exhaust conduit 602 comprises a substantially similar composition of compounds.

The exhaust gas upstream of the mixer 604 is heterogeneous. The three depicted compounds are separated prior to flowing through the mixer 604. Upon reaching the exhaust mixer 604, the exhaust gas interacts with a first portion 608 of the exhaust mixer 604. The exhaust gas flows through passages of the first portion 608 before flowing to a second portion 610.

The second portion 610 also interacts with the exhaust gas prior to flowing to exhaust components located downstream of the mixer 604. FIGS. 7, 8, and 9 depict embodiments of various instruments located downstream of the mixer 604. An example of exhaust flow through the mixer 604 with reference to specific components of the mixer 604 will be described below.

As exhaust begins to flow into the mixer, the first compound may flow into a top inlet 612 located in the top half 603A. The third compound may flow into a bottom inlet 614 located in the bottom half 603B. The top inlet 612 and the bottom inlet 614 (e.g., openings 314 of FIG. 3A) may be located on a first tube of the first portion 608. The second compound may flow into both a leftward middle inlet and a rightward middle inlet (not depicted). The leftward middle inlet and the rightward middle inlet (e.g., openings 312 of FIG. 3A) may be located on a second tube of the first portion 608. As depicted, the second tube intersects the first tube at the center of the exhaust conduit 602 perpendicularly.

Exhaust flows through the tubes of the first portion 608 and mixes at a central portion of the first portion 608. The exhaust flows out of the first portion via outlets 616 and 618 (e.g., two of outlets 222 of FIG. 3A) after mixing. As depicted, the first portion 608 directs the exhaust gas mixture (e.g., the first, second, and third compounds) to flow along the center of the exhaust conduit 602.

A portion of the exhaust gas mixture flowing along the center of the exhaust conduit is captured by the second portion 610 via an inlet 620. Double-arrow line 619 depicted a distance between the first portion 608 and the second portion 610. The distance may be a range of 30 to 40 millimeters. It will be appreciated that other distances between the first portion 608 and the second portion 610 have been realized.

As described above, exhaust gas received by the second portion 610 is equally split into four pathways toward outlets located at ends of each tube of the second portion 610 (see FIG. 3B). Upper outlet 622 and lower outlet 624 (e.g., outlets 366 of FIG. 3B) of a first tube are depicted. As shown, both release a portion of the exhaust gas mixture. The second portion 610 further comprises two more outlets directly behind the outlets 622 and 624. Thus, from the current view, the two other outlets of the second portion 610 are not depicted. Due to an angular offset of the second portion 610 relative to the first portion 608, all of the outlets of the second portion 610 release the exhaust gas mixture in a location of the exhaust conduit 602 where exhaust gas has not mixed. For example, a portion of exhaust gas flowing in the exhaust conduit 602 does not flow into the first portion 608, but rather flows through free spaces around the first portion 608 and is unmixed. The second portion 610 directs the exhaust gas mixture received from the first portion 608 to flow into and mix with the portion of exhaust gas that is unmixed. In this way, exhaust gas in the exhaust conduit 602, downstream of the mixer 604 (e.g., downstream of the second portion 610) has an increased homogeneity and substantially uniform composition.

In this way, the mixer 604 directs an exhaust flowing through the exhaust conduit 602 via the two portions such that various zones of exhaust gas mix and collide that otherwise would not mix. Thus, a homogeneity of the exhaust gas throughout the exhaust conduit 602 downstream of the mixer 604 is increased.

FIG. 6 illustrates an example exhaust flow through a mixer. FIGS. 7, 8, and 9 depict various embodiments and/or locations for the mixer to be located in order to increase a homogeneity of exhaust flow.

Turning now to FIG. 7, a system 700 depicts an embodiment of a mixer 706 downstream of a particulate filter 702 and upstream of a soot sensor 708. The soot sensor 708 may send signals to a controller (e.g., controller 12 of FIG. 1) in order to modify various engine actuators accordingly. For example, if a soot sensor detects a soot level being greater than a threshold soot level, then the controller 12 may reduce a torque output of a vehicle such that soot emissions are reduced. In one embodiment, the mixer 706 may be used as the mixer 68 in the embodiment depicted with respect to FIG. 1.

Particulate filter 702 is upstream of mixer 706. As a result, exhaust flow received by the particulate filter 702 may be increasingly heterogeneous compared to exhaust gas flowing through a mixer (e.g., mixer 706), as described above. The particulate filter 702 releases the exhaust gas into a particulate filter outlet cone 704, upstream of the mixer 706. Exhaust flowing into the mixer 706 experiences a mixing substantially similar to mixing described with respect to FIG. 6. The exhaust downstream of the mixer 706 is increasingly homogenous compared to exhaust upstream of the mixer 706. Exhaust flow is analyzed by the soot sensor 708 in order to determine an amount of soot flowing through the particulate filter 702. Due to the location of the soot sensor, only a portion of the exhaust flow may be analyzed. The increase in homogeneity increases the accuracy of the soot sensor 708 reading.

Turning now to FIG. 8, a system 800 depicts an exhaust conduit 802 with a urea injector 804. The urea injector 804 is upstream of a mixer 806. The mixer 806 is upstream of a selective reduction catalyst (SCR) 808. In this way, the urea may mix with an exhaust gas such that an exhaust gas/urea mixture is more homogenous that it would be without flowing through the mixer 806. By increasing mixing of urea into the exhaust gas, urea coating surfaces of the SCR 808 may increase in uniformity and thereby increase efficiency. The system 800 may be used as mixer 68 in the embodiment depicted with respect to FIG. 1. In such an example, the mixer 806 is substantially equal to the mixer 68 and the urea injector 804 is located downstream of the gas sensor 126 and upstream of the mixer 68. The SCR 808 is equal to or located within the emission control device 70.

Turning now to FIG. 9, a system 900 depicts an engine 902 fluidly coupled to an exhaust conduit 904. The engine 902 may be used as engine 10 in the embodiment of FIG. 1. The engine 902 expels exhaust gas into the exhaust conduit 904 after combusting. The exhaust gas flows through the exhaust conduit 904 before reaching a mixer 906. Exhaust gas is mixed in the mixer 906 before flowing to a gas sensor 908 downstream of the mixer. The gas sensor 908 may be used as the gas sensor 126 in the embodiment of FIG. 1. In this way, the gas sensor 908 may for accurately measure an exhaust gas due to an increase in homogeneity. For example, if the gas sensor 908 is a UEGO sensor, then a more accurate air/fuel ratio may be measured compared to an air/fuel ratio measured by a UEGO sensor of an unmixed exhaust gas.

In this way, a compact, easy to manufacture mixer may be located upstream of a variety of exhaust system components in order to increase an accuracy of a sensor reading or to improve efficacy of exhaust after-treatment devices. By placing a complementary second stage downstream, and angularly offset to a first stage, exhaust gas is redirected and mixed multiple times in order to increase an overall homogeneity of exhaust gas in the exhaust conduit. The technical effect of placing an exhaust mixer in an exhaust conduit is to improve an exhaust gas mixture homogeneity such that components downstream of the mixer may increase functionality.

In a first example, the present invention contemplates an exhaust mixer comprising a pair of cylindrical tubes perpendicularly intersecting along a central axis of an exhaust conduit, where each of the cylindrical tubes comprise upstream-facing inlets proximal to an exhaust conduit wall and outlets proximal to the intersection and central axis facing radially outward from the central axis.

In a first embodiment, the mixer of the first example includes where the mixer additionally or alternatively includes wherein the pair of cylindrical tubes are a first set of cylindrical tubes that intersect fully with each other and define a common interior region connected with each of the inlets and outlets.

In a second embodiment, which optionally includes the first embodiment, the mixer of the first example wherein the mixer further comprises a second, distinct set of cylindrical tubes located downstream of and spaced away from the first set.

In a third embodiment, which optionally includes the first and second embodiments, the mixer of the first example wherein the second set of cylindrical tubes intersect along the central axis of the exhaust conduit, where the second set comprises an inlet opening centered at a central axis and facing upstream, the inlet extending toward each end of the cylindrical tubes and a pair of oblong outlets located proximal to each end of the cylindrical tubes, the outlets facing sideways and facing no more upstream than downstream.

In a fourth embodiment, which optionally includes one or more of the first through third embodiments, the mixer of the first example wherein the inlets of the first set face a direction parallel exhaust gas flow.

In a fifth embodiment, which optionally includes one or more of the first through fourth embodiments, the mixer of the first example wherein the second set of tubes is angularly offset to the first set of tubes by 45° along a central axis.

In a sixth embodiment, which optionally includes one or more of the first through fifth embodiments, the mixer of the first example wherein the first set and the second of tubes set are hollow.

In a seventh embodiment, which optionally includes one or more of the first through sixth embodiments, the mixer of the first example wherein there are no other inlets and no additional outlets in the first and second set of tubes other than those specified.

In an eighth embodiment, which optionally includes one or more of the first through seventh embodiments, the exhaust mixer of the first example wherein the inlets are symmetrically positioned with each other, and wherein the outlets are symmetrically positioned with each other.

In a second example, the present invention contemplates an exhaust gas mixer comprising an upstream section having a first set of intersecting tubes, a downstream section with a second set of intersecting tubes spaced away from the upstream section, wherein the downstream section is rotated about a central axis of an exhaust pipe relative to the first component.

In a first embodiment, the exhaust gas mixer of the second wherein the intersecting tubes of both the upstream section and the downstream section are each hollow and fluidly coupled to exhaust flow in the exhaust pipe.

In a second embodiment, which optionally includes the first embodiment, the exhaust gas mixer of the second example wherein the first set of intersecting tubes and the second set of intersecting tubes intersect at the central axis such that four adjoined pipes are created for the first set and the second set, where each of the four pipes is equal in length.

In a third embodiment, which optionally includes the first and/or second embodiments, the exhaust gas mixer of the second example wherein each pipe of the first set of the upstream section comprises oblong, inlet apertures, proximal to an end of each pipe, facing a direction opposite exhaust gas flow in the exhaust pipe and where the upstream section comprises angled outlets proximal to the central axis.

In a fourth embodiment, which optionally includes the first through third embodiments, the exhaust gas mixer of the second example wherein each pipe of the second set of the downstream section comprises oblong outlets located along an end of each pipe facing a direction perpendicular to the central axis and the downstream section further comprising a four-point star-shaped opening located proximal the intersection of the tubes centered along the central axis.

In a fifth embodiment, which optionally includes the first through fourth embodiments, the exhaust gas mixer of the second stage wherein the upstream section and the downstream section have a cross-shaped cross-section.

In a sixth embodiment, which optionally includes the first through fifth embodiments, the exhaust gas mixer of the second example wherein the upstream section and the downstream section are non-rotatably fixed to an exhaust passage.

In a seventh embodiment, which optionally includes the first through sixth embodiments, the exhaust gas mixer of the second example wherein the upstream section and downstream section are stationary, static mixer components.

In a third example, the present invention contemplates an exhaust gas mixer comprising a first section located upstream of a second section with respect to a direction of exhaust flow, the first section comprising two perpendicularly intersecting cylindrical pipes, where the first section further comprises four angled holes proximal to an intersection of the cylindrical pipes and four oblong apertures, where one oblong aperture is located proximal to an end of a pipe, the second section comprising two perpendicularly intersecting cylindrical pipes, where the second section further comprises eight openings located proximal to an end of each of the pipes of the second section and one four-point star-shaped opening located at a center of the second section where each point of the star-shaped opening extends toward an end of the pipes of the second section.

In a first embodiment, the exhaust gas mixer of the third example wherein the first section and the second section are physically coupled to a mixer pipe slideably disposed and in face-sharing contact with an exhaust conduit.

In a second embodiment, which optionally includes the first embodiment, the exhaust gas mixer of the third example wherein exhaust gas mixes within the pipes of the first section before to the second section, where exhaust gas is further mixed within the pipes of the second section before exiting the exhaust gas mixer.

Note that the example control and estimation routines included herein can be used with various engine and/or vehicle system configurations. The control methods and routines disclosed herein may be stored as executable instructions in non-transitory memory and may be carried out by the control system including the controller in combination with the various sensors, actuators, and other engine hardware. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the example embodiments described herein, but is provided for ease of illustration and description. One or more of the illustrated actions, operations and/or functions may be repeatedly performed depending on the particular strategy being used. Further, the described actions, operations and/or functions may graphically represent code to be programmed into non-transitory memory of the computer readable storage medium in the engine control system, where the described actions are carried out by executing the instructions in a system including the various engine hardware components in combination with the electronic controller.

It will be appreciated that the configurations and routines disclosed herein are exemplary in nature, and that these specific embodiments are not to be considered in a limiting sense, because numerous variations are possible. For example, the above technology can be applied to V-6, I-4, I-6, V-12, opposed 4, and other engine types. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims should be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:

1. An exhaust mixer, comprising:
a pair of cylindrical tubes perpendicularly intersecting along a central axis of an exhaust conduit, where each of the cylindrical tubes comprises upstream-facing inlets proximal to an exhaust conduit wall and outlets proximal to the intersection and the central axis facing radially outward from the central axis.

2. The mixer of claim 1, wherein the pair of cylindrical tubes is a first set of cylindrical tubes that intersects fully with each other and defines a common interior region connected with each of the inlets and outlets.

3. The mixer of claim 2, where the mixer further comprises a second, distinct set of cylindrical tubes located downstream of, and spaced away from, the first set.

4. The mixer of claim 3, wherein the second set of cylindrical tubes intersect along the central axis of the exhaust conduit, where the second set of cylindrical tubes comprises an inlet opening centered at the central axis and facing upstream, the inlet opening extending toward each end of the cylindrical tubes and a pair of oblong outlets located proximal to each end of the cylindrical tubes, the outlets facing sideways and facing no more upstream than downstream.

5. The mixer of claim 3, wherein the inlets of the first set of cylindrical tubes face a direction parallel to exhaust gas flow.

6. The mixer of claim 3, wherein the second set of cylindrical tubes is angularly offset to the first set of cylindrical tubes by 45° along the central axis.

7. The mixer of claim 3, wherein the first and second sets of cylindrical tubes are hollow.

8. The mixer of claim 4, wherein there are no other inlets and no additional outlets in the first and second sets of cylindrical tubes other than those specified.

9. The mixer of claim 1, wherein the inlets are symmetrically positioned with each other, and wherein the outlets are symmetrically positioned with each other.

10. An exhaust gas mixer, comprising:
an upstream section having a first set of intersecting tubes;
a downstream section having a second set of intersecting tubes spaced away from the upstream section, wherein the downstream section is rotated about a central axis of a mixer pipe relative to the upstream section, where the upstream section and the downstream section have a cross-shaped cross-section.

11. The exhaust gas mixer of claim 10, wherein the intersecting tubes of both the upstream section and the downstream section are each hollow and fluidly coupled to exhaust flow in the mixer pipe.

12. The exhaust gas mixer of claim 11, wherein the first set of intersecting tubes and the second set of intersecting tubes intersect at the central axis such that four adjoined pipes are created for the first and second sets of intersecting tubes, where each of the four pipes is equal in length.

13. The exhaust gas mixer of claim 12, wherein each pipe of the first set of the upstream section comprises oblong, inlet apertures, proximal to an end of each pipe, facing a direction opposite the exhaust flow in the mixer pipe and where the upstream section comprises angled outlets proximal to the central axis.

14. The exhaust gas mixer of claim 12, wherein each pipe of the second set of the downstream section comprises oblong outlets located along an end of each pipe facing a direction perpendicular to the central axis and the downstream section further comprising a four-point star-shaped opening located proximal to the intersection of the tubes centered along the central axis.

15. The exhaust gas mixer of claim 10, wherein the upstream section and the downstream section are non-rotatably fixed to an exhaust passage.

16. The exhaust gas mixer of claim 10, wherein the upstream section and the downstream section are stationary, static mixer components.

17. An exhaust gas mixer, comprising:
a first section located upstream of a second section with respect to a direction of exhaust flow;
the first section comprising two perpendicularly intersecting cylindrical pipes, where the first section further comprises four angled holes proximal to an intersection of the cylindrical pipes and four oblong apertures, where one oblong aperture is located proximal to an end of a pipe;
the second section comprising two perpendicularly intersecting cylindrical pipes, where the second section further comprises two openings located proximal to an end of each of the pipes of the second section, for a total of eight openings for all of the pipes of the second section, and one four-point star-shaped opening located at a center of the second section where each point of the star-shaped opening extends toward an end of the pipes of the second section.

18. The exhaust gas mixer of claim 17, wherein the first section and the second section are physically coupled to a mixer pipe slideably disposed and in face-sharing contact with an exhaust conduit.

19. The exhaust gas mixer of claim 17, wherein exhaust gas mixes within the pipes of the first section before flowing to the second section, where exhaust gas is further mixed within the pipes of the second section before exiting the exhaust gas mixer.

* * * * *